April 25, 1933. L. W. JOYCE 1,905,939
SUSPENDER SLIDE WITH BARS FLATTENED AND EMBOSSED ACROSS WELD
Filed April 14, 1931
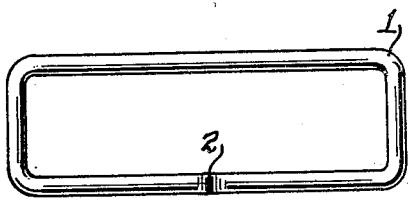
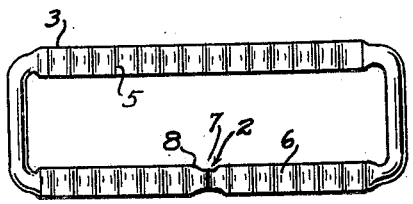
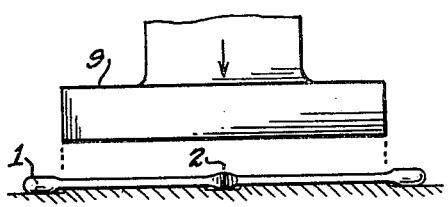
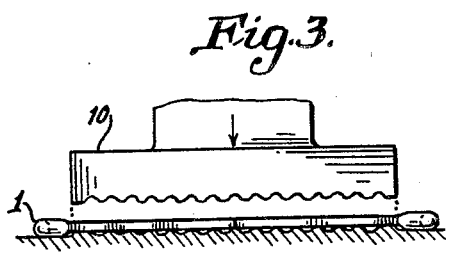
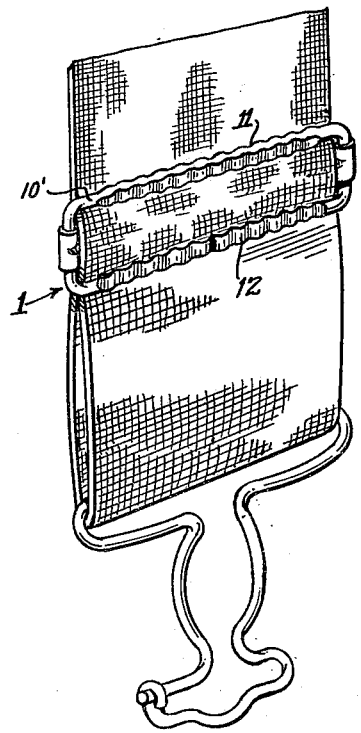
Inventor
L. W. Joyce
By Mason Fenwick Lawrence
Attorneys Patented Apr. 25, 1933

1,905,939

UNITED STATES PATENT OFFICE

LYNDON W. JOYCE, OF GREENSBORO, NORTH CAROLINA, ASSIGNOR TO JOYCE-VENNING MANUFACTURING CO., INC., OF GREENSBORO, NORTH CAROLINA, A CORPORATION OF DELAWARE

SUSPENDER SLIDE WITH BARS FLATTENED AND EMBOSSED ACROSS WELD

Application filed April 14, 1931. Serial No. 530,113.

This invention relates to the manufacture of suspender slides in which the frame is of the endless type with the weld adjacent the middle of one of the bars.

It is old in slides of this type to form the gripping surfaces by flattening and embossing the bars, on both sides of the weld, leaving the bar at the point of weld unflattened, but insofar as I am aware no one has up to the present devised a practical way to flatten and emboss the welded bar across the region of the weld.

It is highly desirable that the gripping surface shall extend entirely across the bars, for the purpose of distributing the strain of the pull of the suspenders over the width of the web, as well as avoiding the presence of shoulders where the gripping surface is discontinuous adjacent the point of weld, since these cause undue wear of the fabric as well as causing it to pucker into the recess at the weld. The main obstacle heretofore, to the flattening and embossing of the welded bar across the region of weld is the fact that a hard scale is formed in the welding process at the point of weld which quickly destroys the embossing tool, the replacement cost of which tool is so great as to make the operation prohibitive.

The present invention has for its object a process for flattening and embossing the welded bar across the region of weld, which avoids the objection hitherto met, and it includes also the slide frame itself as an article of manufacture, having the flattened and embossed gripping surface extending continuously across the region of weld.

Other objects of the invention will appear as the following description of a preferred and practical embodiment thereof proceeds.

In the drawing in which the same reference characters designate identical parts in the several figures:

Figure 1 is a plan view of a suspender slide of the type to which the present invention relates;

Figure 2 represents the first process step;

Figure 3 represents the second or final process step;

Figure 4 is a plan view showing the old form of construction for the purpose of contrasting it with the new; and Figure 5 is a perspective view showing a slide embodying the features of the present invention.

Preparatory to a detailed description of the invention, it may be stated that the slide frame 1 is generally and most cheaply made of round wire bent to an endless rectangular loop welded together adjacent the middle of one of the long sides or bars as indicated at 2. It is customary to flatten portions of the bars as shown at 3 in Figure 4 and to flute or emboss them as indicated at 5 for the purpose of forming gripping surfaces engaging the suspender webbing as seen in Figure 5 with sufficient pressure to enable the slide to maintain its position on the suspender web.

Figure 4 shows that it is usual to leave the wire stock unflattened and unimbossed in the region of the weld 2, and as stated in connection with the objects of the invention, the reason for this is that the embossing tool, which is a delicate and expensive mechanism, becomes quickly ruined by impinging upon the hard scale formed at the weld.

It will be understood from Figure 4 that the flattened gripping surface 6 would be much more efficient if it could be made continuous, since not only would the strain incident to the pull on the suspenders be distributed uniformly over the width of the suspender web, but the recess 7 would not be present into which the material of the web may pucker nor would the shoulders 8 be defined which abrade the surface of the suspender web and finally wear it out.

The present invention provides an improved suspender slide frame in which the welded bar is flattened and embossed uniformly across the region of weld and this is accomplished by a process involving the successive steps of mashing the wire and then embossing it. Figure 2 shows that the step of mashing is accomplished with a flat faced die 9 which in its descent engages the point of weld and the hard scale associated therewith and mashes the wire down to a uniform thickness. It is true that the hard scale may wear the die 9, but the die having an undifferentiated flat face is readily ground into shape, an inexpensive operation and one which does not require the frequent replacement of the die.

After the wire has been flattened it is then subjected to pressure from the embossing die 10 by which the necessary corrugation or other decoration is applied uniformly to the flattened portion throughout its length. Since the elevation of the wire at the point of weld, with its associated scale has been flattened by the die 9 into a common plane with the remainder of the flattened wire, only a comparatively small pressure of the die 9 is required to accomplish the necessary embossing operation, therefore the die 9 is not damaged by the scale or worn away with undue rapidity.

It is to be understood that the illustrations of the two process steps are highly diagrammatic and that any other means may be substituted therefor for accomplishing the same purpose without transcending the scope of the invention.

Figure 5 shows the eventuating product, a slide 10' having both bars uniformly flattened and embossed to form gripping surfaces 11 and 12 extending uniformly across their middle portions and the gripping surface of the bar 12 extending over the point of weld.

While I have in the above description disclosed what I believe to be a practical embodiment of my process and a preferred and practical slide, eventuating from the practice of said process, it is to be understood that the details of construction as described are merely by way of example and are not to be considered as limiting the scope of the invention as claimed.

What I claim as my invention is:

1. Method for manufacturing an endless suspender slide frame of the type having a weld adjacent the middle of one of the cross bars, comprising flattening said bar throughout an extent which includes the region of weld, by a pressing tool having a flat face that can be easily ground, and subsequently embossing the flattened portion by a suitably configured die.

2. Suspender slide frame comprising a closed loop welded adjacent the middle of one of the cross bars, and having the welded cross bar flattened and embossed throughout an extent which includes the point of weld.

In testimony whereof I affix my signature.

LYNDON W. JOYCE.